(12) United States Patent
Raper

(10) Patent No.: US 9,669,768 B1
(45) Date of Patent: Jun. 6, 2017

(54) VEHICULAR-HANGING STORAGE CONTAINER

(71) Applicant: Chris Raper, Myrtle Beach, SC (US)

(72) Inventor: Chris Raper, Myrtle Beach, SC (US)

( * ) Notice: Subject to any disclaimer, the term of this patent is extended or adjusted under 35 U.S.C. 154(b) by 48 days.

(21) Appl. No.: 14/937,161

(22) Filed: Nov. 10, 2015

(51) Int. Cl.
*B60R 9/06* (2006.01)
*B60R 11/00* (2006.01)

(52) U.S. Cl.
CPC ............ *B60R 9/06* (2013.01); *B60R 2011/004* (2013.01); *B60R 2011/0052* (2013.01); *B60R 2011/0059* (2013.01)

(58) Field of Classification Search
CPC ................. B60R 9/06; B60R 2011/004; B60R 2011/0052; B60R 2011/0059; B25H 3/02; B25H 1/04
See application file for complete search history.

(56) References Cited

U.S. PATENT DOCUMENTS

| | | | |
|---|---|---|---|
| 3,727,971 A | 4/1973 | Sisler | |
| 4,846,346 A | 7/1989 | Kime | |
| 5,083,241 A * | 1/1992 | Foster | A47B 97/00 108/23 |
| 5,344,339 A | 9/1994 | Cheslock | |
| 5,547,080 A * | 8/1996 | Klimas | B25H 3/02 182/129 |
| 5,906,381 A * | 5/1999 | Hovatter | B25H 3/028 280/47.18 |
| 5,924,615 A * | 7/1999 | McGarrah | B60R 9/00 220/482 |
| 6,036,203 A * | 3/2000 | Tyus | B25H 3/00 280/47.26 |
| 6,170,839 B1 * | 1/2001 | Kizewski | B25H 3/00 280/47.19 |
| D470,046 S | 2/2003 | Chao | |
| 6,596,941 B2 * | 7/2003 | Tripoli | B60R 11/02 174/135 |
| 6,837,383 B1 * | 1/2005 | McElhaney, Jr. | B25H 5/00 206/373 |
| 7,273,215 B1 * | 9/2007 | Smith | B25H 3/028 280/32.6 |
| 8,415,921 B1 * | 4/2013 | Young | H02J 7/0045 320/107 |
| 8,925,683 B1 * | 1/2015 | Gunsaullus | E06C 1/38 182/129 |
| 2005/0280228 A1 * | 12/2005 | Fernandes | B25H 1/00 280/47.35 |

(Continued)

*Primary Examiner* — Corey Skurdal
(74) *Attorney, Agent, or Firm* — Kyle A. Fletcher, Esq.

(57) ABSTRACT

The vehicular hanging storage container is a cabinet adapted for use with a pickup truck. Specifically, the vehicular hanging storage container is adapted for use with the scaffold commonly used by pickup trucks to store and carry large items, such as ladders, above the bed of the pickup truck. The vehicular hanging storage container is attached to the pickup truck through the combination of hanging the vehicular hanging storage container from the scaffolding using hooks and clamping the cabinet to top rail of the pickup truck bed using an attachment bracket. The vehicular hanging storage container comprises a cabinet, one or more doors, a first hanging hook, a second hanging hook, an extension cord, an electrical outlet and an attachment bracket.

20 Claims, 5 Drawing Sheets

(56) References Cited

U.S. PATENT DOCUMENTS

| | | | | |
|---|---|---|---|---|
| 2007/0029746 A1* | 2/2007 | Brennan | ................ | B25H 3/00 |
| | | | | 280/47.26 |
| 2007/0222166 A1* | 9/2007 | Ruiz | .................. | B25H 3/00 |
| | | | | 280/47.35 |
| 2008/0278046 A1* | 11/2008 | Scheffy | ................ | B25H 3/02 |
| | | | | 312/223.6 |

* cited by examiner

VEHICULAR-HANGING STORAGE CONTAINER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cabinets and tool chests, more specifically, a tool chest configured for use with a vehicle.

SUMMARY OF INVENTION

The vehicular hanging storage container is a cabinet adapted for use with a pickup truck. Specifically, the vehicular hanging storage container is adapted for use with the scaffold commonly used by pickup trucks to store and carry large items, such as ladders, above the bed of the pickup truck. The vehicular hanging storage container is attached to the pickup truck through the combination of hanging the vehicular hanging storage container from the scaffolding using hooks and clamping the cabinet to top rail of the pickup truck bed using an attachment bracket. The vehicular hanging storage container is further fitted with a plurality of wheels and a one or more kickstands to allow for the vehicular hanging storage container to be removed from the pickup truck and physically moved to a work site for use. The vehicular hanging storage container is further fitted with an extension cord and outlet for use with power tools.

These together with additional objects, features and advantages of the vehicular hanging storage container will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicular hanging storage container in detail, it is to be understood that the vehicular hanging storage container is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicular hanging storage container.

It is therefore important that the claims be regarded as including such equivalent construction insofar as they do not depart from the spirit and scope of the vehicular hanging storage container. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
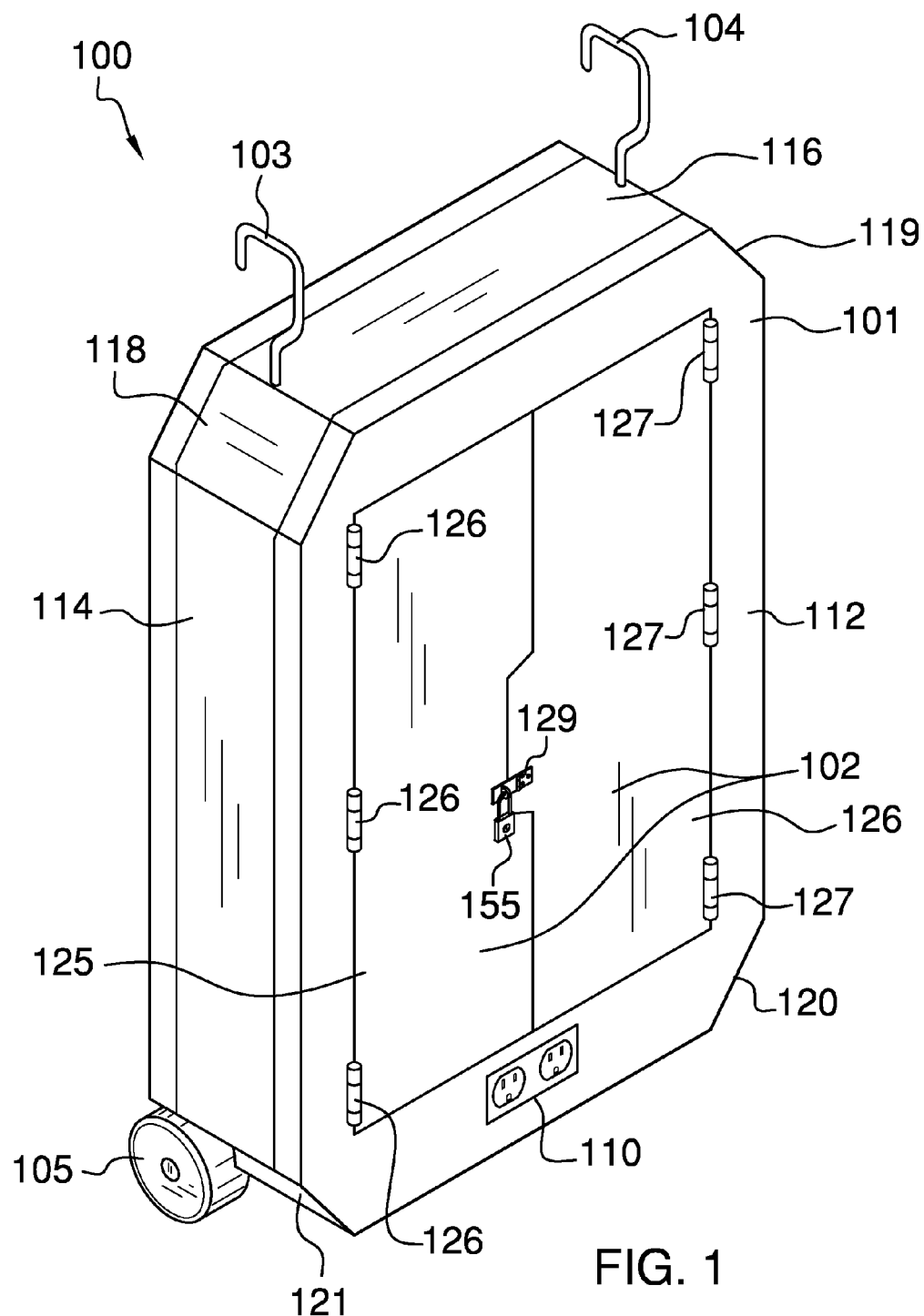
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5. The vehicular hanging storage container 100 is a cabinet 101 adapted for use with a pickup truck 151. Specifically, the vehicular hanging storage container 100 is adapted to work with the scaffold 154 commonly used by pickup trucks 151 to store and carry large items, such as ladders, above the bed 152 of the pickup truck 151.

The vehicular hanging storage container 100 (hereinafter invention) comprises the cabinet 101, one or more doors 102, a first hanging hook 103, a second hanging hook 104, first wheel 105, a second wheel 106, a plurality of kickstands 107, an extension cord 108, an extension cord wrap 109, an electrical outlet 110 and an attachment bracket 111.

The cabinet 101 is a container that takes advantage of unused space within the pickup truck 151 bed 152 in order to provide additional storage. The cabinet 101 is made of metal and is further defined by a front side 112, a rear side 113, a left side 114, a right side 115, a top side 116 and a bottom side 117. The front side 112 of the cabinet 101 is the side of the cabinet 101 in which the one or more doors 102 are mounted. The rear side 113 of the cabinet 101 is the side of the cabinet 101 that is distal from the front side 112. The top side 116 of the cabinet 101 has the first hanging hook 103 and the second hanging hook 104 mounted in it. The bottom side 117 is the side of the cabinet 101 distal from the top side 116 of the cabinet 101. When viewed from the front, the left side 114 of the cabinet 101 is the side of the cabinet 101 to the viewers left. The right side 115 of the cabinet 101 is the side of the cabinet 101 that is distal from the left side 114.

In the first potential embodiment of the disclosure, as shown most clearly in FIG. 1, the cabinet 101 further comprises a plurality of beveled surfaces referred to as the first bevel 118, the second bevel 119, the third bevel 120, and the fourth bevel 121. Each of the beveled surfaces is an angled surface that is neither parallel nor perpendicular to the two sides between which the beveled surface selected from the plurality of beveled surfaces are placed. The first bevel 118 is located between the left side 114 and the top side 116. The second bevel 119 is located between the top side 116 and the right side 115. The third bevel 120 is located between the right side 115 and the bottom side 117. The fourth bevel 121 is located between the bottom side 117 and the left side 114.

The interior of the cabinet 101 is fitted with a plurality of hooks 122 and a plurality of storage compartment 123 which are designed to hang and store tools, hardware, parts and accessories as required.

The one or more doors 102 are mounted in the front side 112 of the cabinet 101. Each of the one or more doors 102 is attached to the cabinet 101 using one or more hinges. Each of the one or more doors 102 is held securely in the closed position through the use of a magnetic latch 128. The magnetic latch 128 comprises a first magnet and a second magnet. The first magnet is mounted on a first door 124. If the one or more doors 102 only comprises a single door, the second magnet is mounted on the cabinet 101. If a second door 125 is used, the second magnet is mounted on the second door 125. Commercially available locking hardware 129 is provided with the one or more doors 102 to allow the cabinet 101 to be locked with a pad lock 155.

In the first potential embodiment of the disclosure, as shown most clearly in FIG. 1, the one or more doors 102 comprises the first door 124 and the second door 125. The first door 124 is attached to the cabinet 101 using one or more first hinges 126. The second door 125 is attached to the cabinet 101 using one or more second hinges 127.

The cabinet 101 of the invention 100 is suspended from the scaffold 154 of the pickup truck 151 using the first hanging hook 103 and the second hanging hook 104. The first hanging hook 103 and the second hanging hook 104 are both commercially available hooks that are bolted into the top side 116 of the cabinet 101.

The first wheel 105 and the second wheel 106 are commercially available wheels that are mounted next to the left side 114 and the right side 115 (respectively) of the cabinet 101 near the bottom side 117 of the invention 100. Methods to mount wheels to containers are well known and documented in the art. The purpose of the first wheel 105 and the second wheel 106 is to allow the invention 100 to be easily moved to a work site once the invention 100 is detached from the pickup truck 151.

One or more kickstands 107 are mounted on the rear side 113 of the cabinet 101. Each of the one or more kickstands 107 is mounted on the on the rear side 113 of the cabinet 101 such that: 1) each of the one or more kickstands 107 can be rotated away from the rear side 113 of the cabinet 101; and, 2) the cabinet 101 can be rotated around the first wheel 105 and the second wheel 106 such that the weight of the cabinet 101 is borne by each of the one or more kickstands 107. As shown most clearly in FIG. 3, when used in this manner, each of the one or more kickstands 107 acts and an additional weight bearing point that stabilizes the cabinet 101 and prevents the cabinet 101 from accidentally falling over. Kickstands are readily and commercially available.

Figure 3:
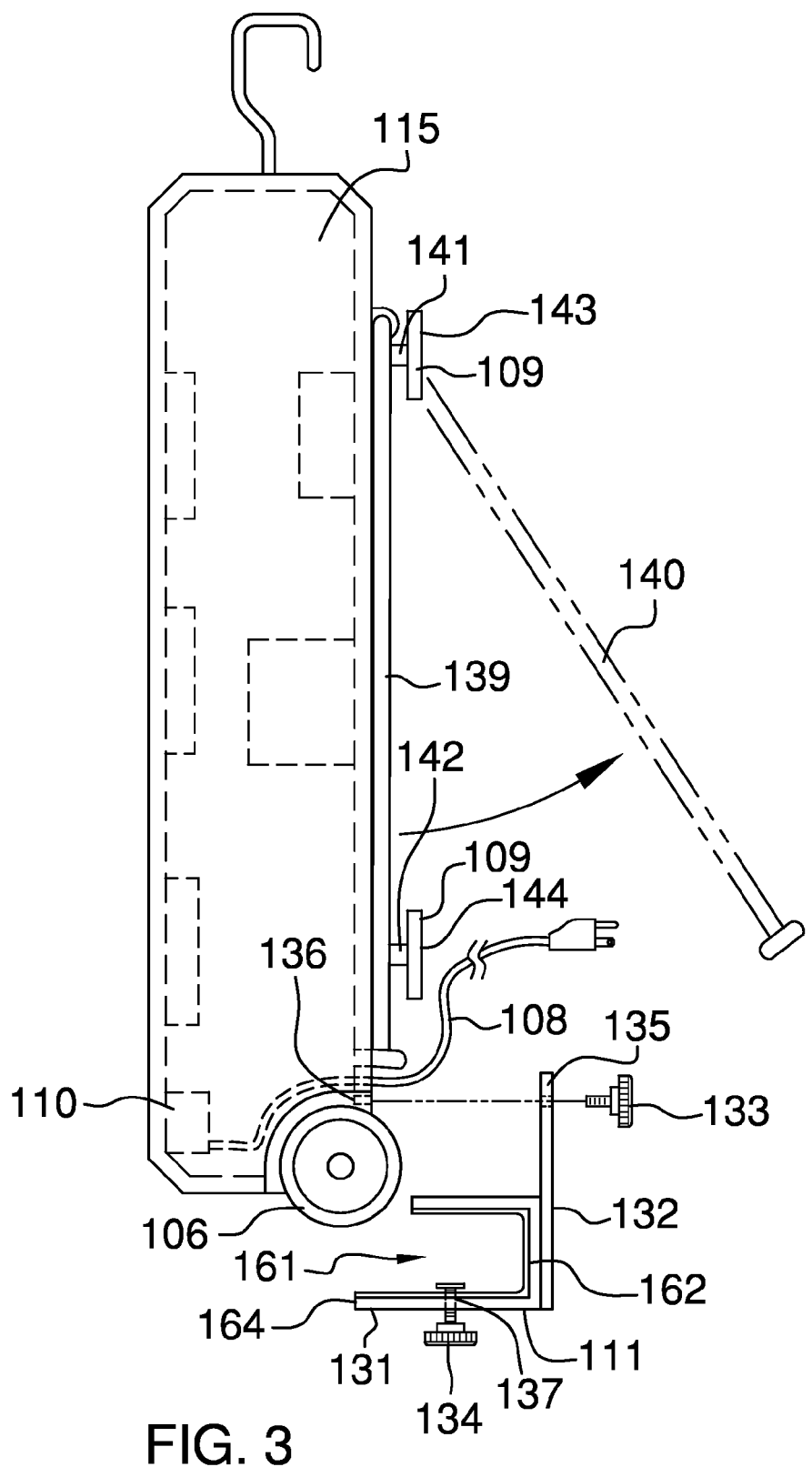
FIG. 3 is a side view of an embodiment of the disclosure.
Figure 4:
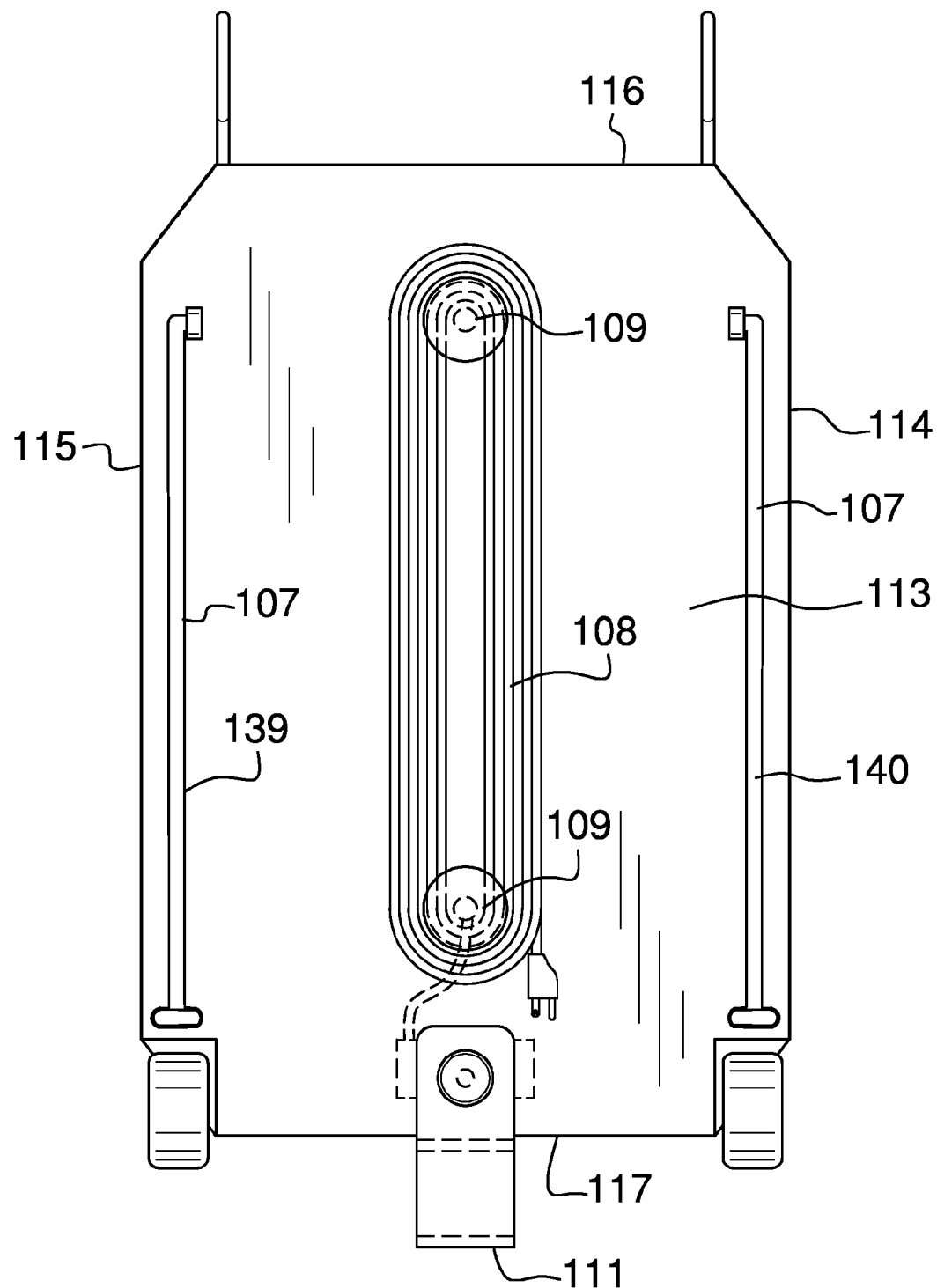
FIG. 4 is a rear view of an embodiment of the disclosure.
Figure 5:
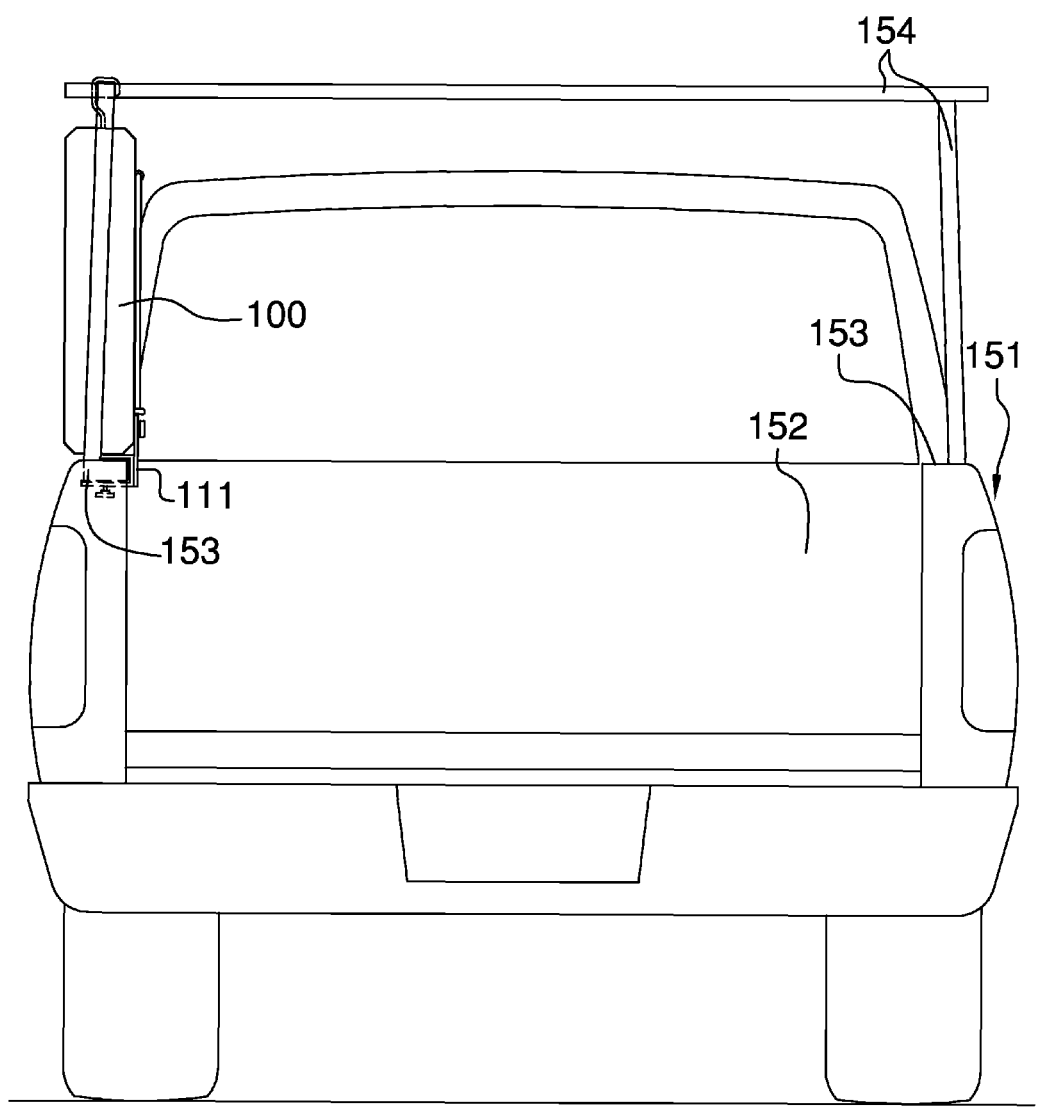
FIG. 5 is an in use view of an embodiment of the disclosure.

In the first potential embodiment of the disclosure, as shown most clearly in FIGS. 3 and 4, the one or more kickstands 107 comprises a first kickstand 139 and a second kickstand 140.

Figure 2:
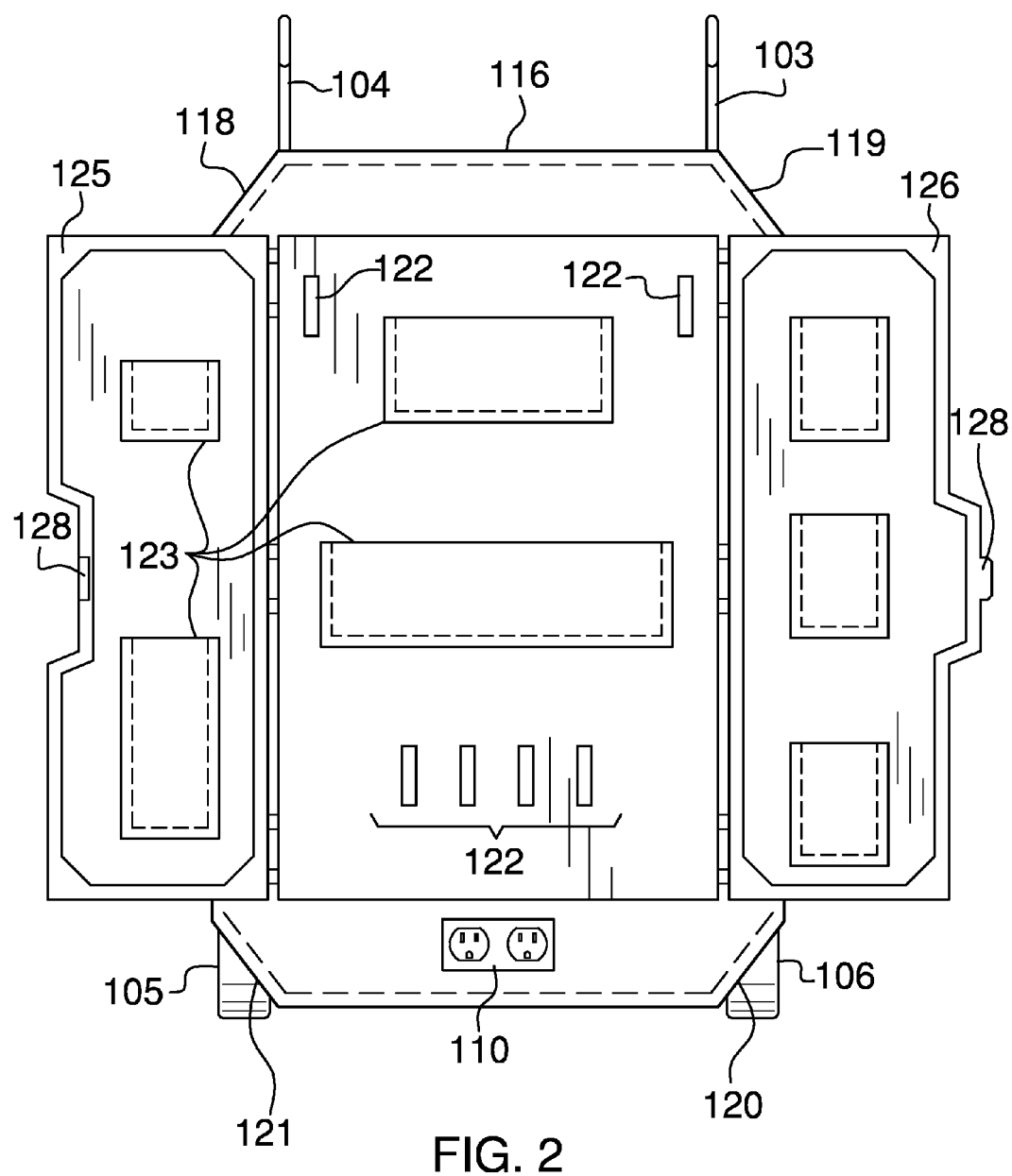
FIG. 2 is a front view of an embodiment of the disclosure.

As shown in FIGS. 1 and 2, an electrical outlet 110 is mounted in the front side 112 of the cabinet 101 between the one or more doors 102 and the bottom side 117 of the cabinet 101. The purpose of the electrical outlet 110 is to provide electrical power for the use of tools and other electrical devices on the work site. The electrical outlet 110 is provided electricity through the use of an extension cord 108. The extension cord 108 is routed through the rear side 113 of the cabinet 101 and connected to the electrical outlet 110. Methods to properly route electrical cables and connect electrical cables to an outlet are well known and documented in the art.

The extension cord wrap 109 is mounted on the rear side 113 of the cabinet 101. The extension cord wrap 109 comprises a first post 141, a second post 142, a first disk 143 and a second disk 144. The first post 141 projects perpendicularly away from the rear side 113 of the cabinet 101. The second post 142 projects perpendicularly away from the rear side 113 of the cabinet 101. The extension cord 108 is stored by wrapping the extension cord 108 around the first post 141 and the second post 142. In order to prevent the extension cord 108 from slipping off the first post 141, a first disk 143 is mounted perpendicularly to the first post 141 on the end of the first post 141 that is distal from the rear side 113. In order to prevent the extension cord 108 from slipping off the second post 142, a second disk 144 is mounted perpendicularly to the second post 142 on the end of the second post 142 that is distal from the rear side 113.

The attachment bracket 111 is used to attach the cabinet to the top rail 153 of the pickup truck 151 bed 152. The attachment bracket 111 comprises a U bracket 131, a vertical strut 132, a cabinet bolt 133, and a top rail bolt 134. The U bracket 131 is a piece of steel that is formed in the shape of a U. The U bracket 131 is further defined with an open end 161, a closed end 162, a first arm 163 and a second arm 164. As shown most clearly in FIG. 3, the open end 161 of the U bracket 131 is formed via the first arm 163 and the second arm 164 of the U bracket 131. The open end 161 is sized to fit around the top rail 153 of the pickup truck 151 bed 152. The vertical strut 132 is a steel plate that is welded to the closed end 162 of the U bracket 131 such that the vertical strut 132 is perpendicular to the first arm 163 and the second arm 164. The vertical strut 132 is further formed with a first cabinet bolt hole 135. The second arm 164 of the U bracket 131 is further formed with a first top rail bolt hole 137. The rear side 113 of the cabinet 101 is further formed with a second cabinet bolt hole 136 that is identical in size to the first cabinet bolt hole 135.

To install the invention 100 onto a pickup truck 151 fitted with a scaffold 154, the cabinet 101 is hung from the scaffold 154 using the first hanging hook 103 and the second hanging hook 104. The bottom side 117 of the cabinet 101 is allowed to rest on the top rail 153 of the pickup truck 151 bed 152. The attachment bracket 111 is attached to the top rail 153 of the pickup truck 151 bed 152 by screwing the first top rail bolt 134 through the first top rail bolt hole 137 until the first top rail bolt 134 presses against the top rail 153 of the pickup truck 151 bed 152. The friction of the first top rail bolt 134 against the top rail 153 of the pickup truck 151 bed 152 will hold the U bracket 131 in position. The U bracket 131 is positioned along the first top rail bolt 134 and presses against the top rail 153 of the pickup truck 151 bed 152 such that the first cabinet bolt hole 135 and the second cabinet bolt hole 136 are aligned. The cabinet bolt 133 is then screwed through the first cabinet bolt hole 135 into the second cabinet bolt hole 136 to secure the cabinet 101 to the attachment bracket 111.

The following definitions were used in this disclosure:

Kickstand: A swiveling bar or rod that is used to hold up a wheeled object when the object is not being moved.

Pickup Truck: As used in this disclosure, a pickup truck is a truck having an enclosed cab and an open body with low sides and a tailgate that is powered by an internal combustion engine.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A storage container comprising:
   a cabinet, one or more doors, a first hanging hook, a second hanging hook, a first wheel, a second wheel, one or more kickstands, an extension cord, an extension cord wrap, an electrical outlet and an attachment bracket;
   wherein the storage container is adapted for use with a pickup truck;
   wherein the storage container is adapted for use with a scaffold used by pickup trucks;
   wherein the first hanging hook and the second hanging hook are used to attach the storage container from the scaffold;
   wherein the attachment bracket attaches the cabinet to a top rail of the pickup truck.

2. The storage container according to claim 1 wherein the cabinet is made of metal;
   wherein the cabinet is further defined by a front side, a rear side, a left side, a right side, a top side and a bottom side.

3. The storage container according to claim 2 wherein an interior of the cabinet is fitted with a plurality of hooks and a plurality of storage compartment.

4. The storage container according to claim 3 wherein the one or more doors are mounted in the front side of the cabinet;
   wherein each of the one or more doors is held securely in a closed position through the use of a magnetic latch.

5. The storage container according to claim 4 wherein the cabinet is suspended from the scaffold of the pickup truck using the first hanging hook and the second hanging hook.

6. The storage container according to claim 5 wherein the one or more kickstands are mounted on the rear side of the cabinet;
   wherein each of the one or more kickstands is mounted on the rear side of the cabinet such that each of the one or more kickstands can be rotated away from the rear side of the cabinet;
   wherein each of the one or more kickstands is mounted on the rear side of the cabinet such that the cabinet can be rotated around the plurality of wheels such that the weight of the cabinet is borne by each of the one or more kickstands.

7. The storage container according to claim 6 wherein the electrical outlet is mounted in the front side of the cabinet.

8. The storage container according to claim 7 wherein the electrical outlet is provided electricity through the extension cord.

9. The storage container according to claim 8 wherein the extension cord is routed through the rear side of the cabinet and connected to the electrical outlet.

10. The storage container according to claim 9 wherein the extension cord wrap is mounted on the rear side of the cabinet.

11. The storage container according to claim 10 wherein the extension cord wrap comprises a first post, a second post, a first disk and a second disk.

12. The storage container according to claim 11 wherein the attachment bracket comprises a U bracket, a vertical strut, a cabinet bolt, and a top rail bolt.

13. The storage container according to claim 12 wherein the U bracket is a piece of steel that is formed in the shape of a U;
    wherein the U bracket is further defined with an open end, a closed end, a first arm and a second arm;
    wherein the open end of the U Bracket is formed by the first arm and the second arm.

14. The storage container according to claim 13 wherein the open end is sized to fit around the top rail of the pickup truck bed.

15. The storage container according to claim 14 wherein the vertical strut is a steel plate that is welded to the closed end of the U bracket such that the vertical strut is perpendicular to the first arm and the second arm.

16. The storage container according to claim 15 wherein the vertical strut is further formed with a first cabinet bolt hole.

17. The storage container according to claim 16 wherein the second arm of the U bracket is further formed with a first top rail bolt hole.

18. The storage container according to claim 17 wherein the rear side of the cabinet is further formed with a second cabinet bolt hole that is identical in size to the first cabinet bolt hole.

19. The storage container according to claim 18 wherein the attachment bracket is attached to the top rail of the pickup truck bed by screwing the first top rail bolt through the first top rail bolt hole until the first top rail bolt presses against the top rail of the pickup truck bed;
    wherein the U bracket is positioned along the top rail of the pickup truck bed such that the first cabinet bolt hole and the second cabinet bolt hole are aligned.

20. The storage container according to claim 19 wherein the cabinet bolt is screwed through the first cabinet bolt hole into the second cabinet bolt hole.

* * * * *